(12) United States Patent
Hu

(10) Patent No.: US 12,420,615 B2
(45) Date of Patent: Sep. 23, 2025

(54) METHOD AND APPARATUS FOR COOLING PASSENGER COMPARTMENT AND BATTERY, AND VEHICLE

(71) Applicant: GREAT WALL MOTOR COMPANY LIMITED, Baoding (CN)

(72) Inventor: Kang Hu, Baoding (CN)

(73) Assignee: GREAT WALL MOTOR COMPANY LIMITED, Baoding (CN)

(*) Notice: Subject to any disclaimer, the term of this patent is extended or adjusted under 35 U.S.C. 154(b) by 213 days.

(21) Appl. No.: 18/010,493

(22) PCT Filed: Dec. 10, 2021

(86) PCT No.: PCT/CN2021/137146
§ 371 (c)(1),
(2) Date: Dec. 15, 2022

(87) PCT Pub. No.: WO2022/127707
PCT Pub. Date: Jun. 23, 2022

(65) Prior Publication Data
US 2023/0347713 A1    Nov. 2, 2023

(30) Foreign Application Priority Data
Dec. 18, 2020  (CN) .......................... 202011503915.6

(51) Int. Cl.
*B60H 1/00*   (2006.01)

(52) U.S. Cl.
CPC ..... *B60H 1/00764* (2013.01); *B60H 1/00278* (2013.01); *B60H 1/00878* (2013.01)

(58) Field of Classification Search
CPC ............ B60H 1/00278; B60H 1/00771; B60H 1/00764; B60H 1/00778; B60H 2001/2253
See application file for complete search history.

(56) References Cited

U.S. PATENT DOCUMENTS 11,485,192 B2 *  11/2022  Bruneau ........... H01M 10/6557
2010/0239894 A1 *  9/2010  Saito ..................... B60L 3/0046
429/50

(Continued)

FOREIGN PATENT DOCUMENTS

CN          110588277          12/2019
CN          111251826          6/2020
(Continued)

OTHER PUBLICATIONS

Extended European Search Report for App. No. 21905636.3, dated Jan. 22, 2024 (8 pages).

(Continued)

*Primary Examiner* — Jianying C Atkisson
*Assistant Examiner* — Meraj A Shaikh
(74) *Attorney, Agent, or Firm* — NIXON PEABODY LLP; Jeffrey L. Costellia

(57) ABSTRACT

Disclosed are a method for cooling a passenger compartment and a battery, comprising: step S101, determining the current driving stage of a vehicle; S102, querying, according to a correlation between a driving stage and a cooling strategy, a target cooling strategy corresponding to the current driving stage of the vehicle, wherein different driving stages correspond to different cooling strategies, and each cooling strategy comprises passenger compartment cooling and battery cooling; and S103, cooling a passenger compartment and/or a battery according to the target cooling strategy. Also disclosed are an apparatus for cooling a passenger compartment and a battery, and a vehicle to which the method is applied.

14 Claims, 3 Drawing Sheets

(56) References Cited

U.S. PATENT DOCUMENTS

2015/0380781 A1* 12/2015 Steinmeyer ......... H01M 10/486
                                                      429/50
2018/0178615 A1*  6/2018 Xia ..................... H01M 10/486
2021/0316593 A1* 10/2021 Ishizeki ............. B60H 1/00785

FOREIGN PATENT DOCUMENTS

| | | | |
|---|---|---|---|
| CN | 111688544 | 9/2020 | |
| CN | 111688544 A * | 9/2020 | ......... B60H 1/00271 |
| CN | 111 993 860 A | 11/2020 | |
| CN | 112018471 | 12/2020 | |
| CN | 112622561 | 4/2021 | |
| DE | 10-2009-015653 | 11/2009 | |
| DE | 10-2020-107352 A1 | 10/2020 | |
| JP | 2016-199151 | 12/2016 | |
| WO | WO-2019/181311 | 9/2019 | |
| WO | 2020/129258 A1 | 6/2020 | |
| WO | WO-2020/110509 | 6/2020 | |

OTHER PUBLICATIONS

International Search Report for Application No. PCT/CN2021/137146, mailed Mar. 16, 2022 (4 pages).
Chinese Office Action for Application No. 202011503915.6, mailed Dec. 24, 2021 (9 pages).

* cited by examiner

METHOD AND APPARATUS FOR COOLING PASSENGER COMPARTMENT AND BATTERY, AND VEHICLE

CROSS-REFERENCES TO RELATED APPLICATIONS

This application is a national phase of PCT application No. PCT/CN2021/137146, filed on Dec. 10, 2021, which claims the priority of the Chinese patent application filed on Dec. 18, 2020 before the China Patent Office with the application number of 202011503915.6 and the title of "METHOD AND APPARATUS FOR COOLING PASSENGER COMPARTMENT, AND VEHICLE", which is incorporated herein by reference in their entirety.

TECHNICAL FIELD

The disclosure relates to the technical field of electric vehicles and more particularly, to a method and an apparatus for cooling a passenger compartment and a battery, and a vehicle.

BACKGROUND

At present, energy shortage is increasingly more prominent, voices of countries all over the world to develop new energy sources are getting stronger and stronger, and China is vigorously supporting development of the new energy automobile industry through various policies. Development of new energy vehicles is mainly restricted by development of batteries. For the new energy vehicles, cooling of the batteries has always been a difficult problem for engineers, because an optimum temperature for the batteries is usually between 25° C. and 35° C., and for this operation range, it is required that the batteries should be cooled by an air-conditioning system on a whole vehicle. However, requirement of simultaneously cooling the batteries and a passenger compartment, that is, a so-called refrigeration double duty condition, cannot be met by the air-conditioning system on the condition that an ambient temperature is high. A matched air-conditioning system is expensive if the requirement is met simultaneously, which puts great cost pressure on a whole vehicle factory. From perspective of energy consumption, it is also uneconomical for matching an air-conditioning system with better performance to provide cooling of the passenger compartment and a battery pack at the same time. Especially for pure electric vehicles, high air-conditioning energy consumption directly affects endurance of the whole vehicle, which further results in serious customer complaints.

Therefore, it is an urgent problem to be solved to balance cooling of the passenger compartment and the batteries.

SUMMARY

A method and an apparatus for cooling a passenger compartment and a battery, and a vehicle are provided in embodiments of the present disclosure, so as to overcome technical problems described above.

In order to solve the problems described above, in an aspect of the present disclosure, a method for cooling a passenger compartment and a battery is provided in an embodiment of the present disclosure, which includes:
determining a current driving phase of a vehicle;
querying a target cooling strategy corresponding to the current driving phase of the vehicle according to a corresponding relationship between a driving phase and a cooling strategy, wherein different driving phases correspond to different cooling strategies, and each of the cooling strategies includes cooling the passenger compartment and cooling the battery; and
cooling the passenger compartment and/or the battery according to the target cooling strategy.

In an embodiment of the present disclosure, the driving phase includes a start-up phase,
determining the current driving phase of the vehicle includes:
determining that the vehicle is currently in the start-up phase, on the condition that a trigger operation of powering up the vehicle is received.
Cooling the passenger compartment and/or the battery according to the target cooling strategy includes:
prioritizing to only cool the battery according to the target cooling strategy corresponding to the start-up phase until a current temperature of the battery is lower than a preset first temperature threshold of the battery and a current temperature of the passenger compartment exceeds a first preset temperature threshold of the passenger compartment, and then switching to only cool the passenger compartment.

In an embodiment of the present disclosure, prioritizing to only cool the battery according to the target cooling strategy corresponding to the start-up phase includes:
determining the current temperature of the battery;
cooling only the battery on the condition that the current temperature of the battery exceeds the first temperature threshold of the battery.
In a process of only cooling the passenger compartment, the method further includes:
determining whether the current temperature of the battery exceeds a preset second temperature threshold of the battery, and switching to only cool the battery on the condition that the current temperature of the battery exceeds the second temperature threshold of the battery;
wherein the second temperature threshold of the battery is greater than the first temperature threshold of the battery.

In an embodiment of the present disclosure, the driving phase further includes an operation phase,
cooling the passenger compartment and/or the battery according to the target cooling strategy includes:
cooling the passenger compartment and/or the battery according to the target cooling strategy corresponding to the operation phase on the condition that the current temperature of the battery does not exceed the first temperature threshold of the battery and the current temperature of the passenger compartment does not exceed the first temperature threshold of the passenger compartment; or
in a process of cooling only the passenger compartment, cooling the passenger compartment and/or the battery according to the target cooling strategy corresponding to the operation phase on the condition that the current temperature of the battery does not exceed the second temperature threshold of the battery and the current temperature of the passenger compartment is reduced to be less than or equal to a preset second temperature threshold of the passenger compartment;
wherein the second temperature threshold of the passenger compartment is less than the first temperature threshold of the passenger compartment.

In an embodiment of the present disclosure, the driving phase includes an operation phase,
  cooling the passenger compartment and/or the battery according to the target cooling strategy includes:
  prioritizing to cool the passenger compartment according to the target cooling strategy corresponding to the operation phase until the current temperature of the battery exceeds a preset third temperature threshold of the battery, and then switching to only cool the battery.

In an embodiment of the present disclosure, in a process of cooling the passenger compartment, the method further includes:
  determining whether the current temperature of the battery exceeds the third temperature threshold of the battery;
  on the condition that the current temperature of the battery does not exceed the third temperature threshold of the battery, querying a target required inlet water temperature of the battery corresponding to the current temperature of the battery according to a corresponding relationship between a temperature of the battery and a required inlet water temperature of the battery, and cooling the battery according to the target required inlet water temperature of the battery and remaining the current temperature of the passenger compartment not exceeding a preset third temperature threshold of the passenger compartment at the same time, wherein different temperature intervals of the battery correspond to different required inlet water temperatures of the battery.

In an embodiment of the present disclosure, the corresponding relationship between the temperature of the battery and the required inlet water temperature of the battery includes:
  on the condition that a preset fourth temperature threshold of the battery is less than or equal to the temperature of the battery and the temperature of the battery is less than a preset fifth temperature threshold of the battery, the required inlet water temperature of the battery is a first temperature;
  on the condition that the fifth temperature threshold of the battery is less than or equal to the temperature of the battery and the temperature of the battery is less than a preset sixth temperature threshold of the battery, the required inlet water temperature of the battery is a second temperature;
  on the condition that the sixth temperature threshold of the battery is less than or equal to the temperature of the battery and the temperature of the battery is less than the third temperature threshold of the battery, the required inlet water temperature of the battery is a third temperature;
  wherein the third temperature is less than the second temperature and the second temperature is less than the first temperature.

In order to solve the problems described above, in an aspect of the present disclosure, an apparatus for cooling a passenger compartment and a battery is provided in an embodiment of the present disclosure, which includes:
  a driving phase determination module configured to determine a current driving phase of the vehicle;
  a target cooling strategy query module configured to query a target cooling strategy corresponding to the current driving phase of the vehicle according to a corresponding relationship between a driving phase and a cooling strategy, wherein different driving phases correspond to different cooling strategies, and each of the cooling strategies includes cooling the passenger compartment and cooling the battery; and
  a target cooling strategy execution module configured to cool the passenger compartment and/or the battery according to the target cooling strategy.

In an embodiment of the present disclosure, the driving phase includes a start-up phase,
  the driving phase determination module includes:
  a start-up phase determination submodule configured to determine that the vehicle is currently in the start-up phase, on the condition that a trigger operation of powering up the vehicle is received; and
  the target cooling strategy execution module includes:
  a first start-up phase execution submodule configured for prioritizing to only cool the battery according to the target cooling strategy corresponding to the start-up phase until a current temperature of the battery is lower than a preset first temperature threshold of the battery and a current temperature of the passenger compartment exceeds a first preset temperature threshold of the passenger compartment, and then switching to only cool the passenger compartment.

In order to solve the above problems, in another aspect of the present disclosure, a vehicle is further disclosed in an embodiment of the present disclosure, which includes a passenger compartment, a battery, an air conditioning system, a memory for storing executable instructions of a controller, and the controller;
  the controller is configured to execute the method for cooling the passenger compartment and the battery according to an embodiment of the present disclosure so as to control the air conditioning system to cool the passenger compartment and/or the battery.

The disclosed embodiment includes following advantages:
  in the disclosed embodiment, by determining the current driving phase of the vehicle, the target cooling strategy corresponding to the current driving phase of the vehicle is queried according to the corresponding relationship between the driving phase and the cooling strategy. Different driving phases correspond to different cooling strategies, and each of the cooling strategies includes cooling the passenger compartment and cooling the battery. Finally, the passenger compartment and/or the battery are cooled according to the target cooling strategy, thus realizing a timely cooling strategy for the passenger compartment and the battery, so that both cooling of the battery and cooling comfort of the passenger compartment can be provided at the same time with limited capacity of the air conditioning system; and meanwhile, energy consumption of the whole vehicle can be reduced to the greatest extent, and more energy of the whole vehicle may be used for vehicle endurance.

The above description is only a summary of technical solutions of the present disclosure, which can be implemented according to contents of the specification in order to better understand technical means of the present disclosure; and in order to make above and other objects, features and advantages of the present disclosure more obvious and understandable, detailed description of the present disclosure is particularly provided in the following.

BRIEF DESCRIPTION OF THE DRAWINGS

In order to explain embodiments of the present disclosure or the technical solutions in the prior art more clearly, the drawings required in the description of the embodiments or the prior art will be briefly introduced below; obviously, the drawings in the following description are only some embodiments of the present disclosure, and other drawings can be obtained according to these drawings by those of ordinary skill in the art without paying creative labor.

DETAILED DESCRIPTION OF THE EMBODIMENTS

In the following, the technical solution in the embodiment of the disclosure will be described clearly and completely in connection with the drawings; obviously, the described embodiment is intended to be only a part of the embodiment of the disclosure, but not all of them. On a basis of the embodiments in this disclosure, all other embodiments obtained by the ordinary skilled in the art without paying creative effort are within a protection scope of this disclosure.

In view of technical problems proposed in the background art of embodiments of the present disclosure, a method for cooling a passenger compartment and a battery is provided in an embodiment of the disclosure, which may adaptively change a priority strategy for cooling the passenger compartment and the battery according to different driving phases and different conditions in the driving phases, embodying a thought and principle of "timely", so as to provide both cooling of the battery without affecting dynamic property of the whole vehicle and battery life and cooling comfort of the passenger compartment with no customer complaint being caused, with limited capacity of an air conditioning system. Meanwhile, energy consumption of the whole vehicle may be reduced to the greatest extent, and more energy of the whole vehicle may be used for vehicle endurance, with high flexibility. The timely cooling strategy according to this embodiment provides a maximum matching performance boundary of the air conditioning system of the whole vehicle, which facilitates cost control of the air conditioning system.

Figure 1:
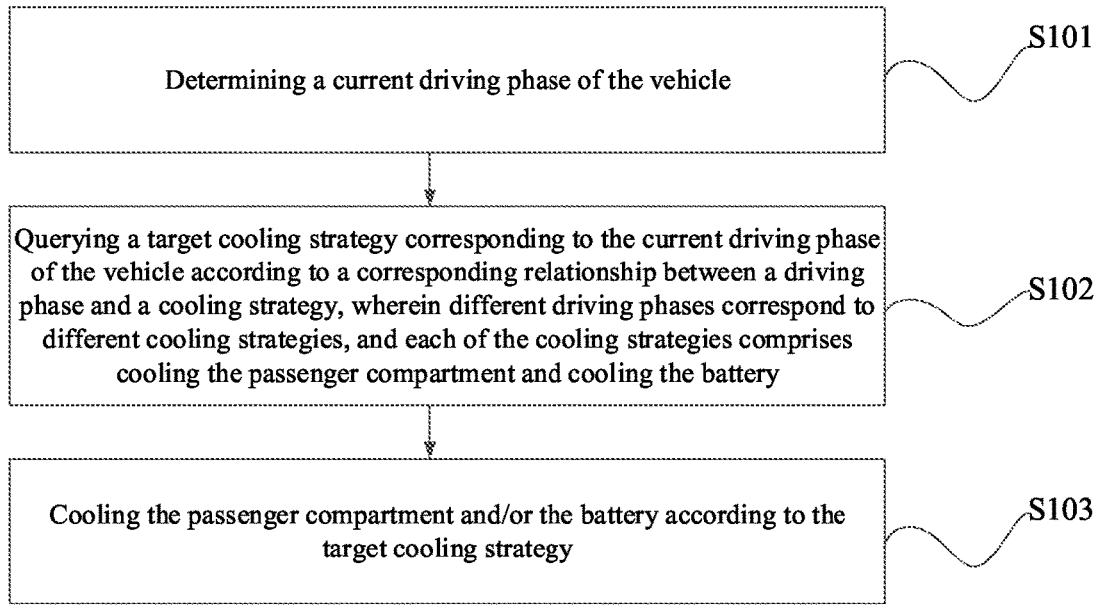
FIG. 1 is a flow chart of a method for cooling a passenger compartment and a battery according to an embodiment of the present disclosure.

Referring to FIG. 1, a flow chart of a method for cooling a passenger compartment and a battery according to an embodiment of the present disclosure is shown, and the method may specifically include following steps S101 to S103.

In step S101, determining a current driving phase of the vehicle.

According to actual situations of the whole vehicle, driving phases includes two phases in this disclosure, namely, a start-up phase and an operation phase.

The start-up phase refers to a phase in which the vehicle is just powered on, at which time a user may or may not be in the passenger compartment. An expression "powered on" means that an ignition gear of the vehicle is on, that is, in an IG-ON mode. In the IG-ON mode, lights on an instrument panel are on, and all electrical equipment can operate.

The operation phase refers to a driving process after the vehicle starts up, and at this time the user is in the passenger compartment for a long time.

For example, it is determined by a vehicle system that the vehicle is currently in the start-up phase, on the condition that a trigger operation of powering up the vehicle is received.

In step S102, querying a target cooling strategy corresponding to the current driving phase of the vehicle according to a corresponding relationship between a driving phase and a cooling strategy, wherein different driving phases correspond to different cooling strategies, and each of the cooling strategies includes cooling the passenger compartment and cooling the battery.

Considering that a temperature of the battery is high in summer or on the condition that the vehicle is just powered off and then powered on again, an execution strategy in which the battery is prioritized is set for the start-up phase in this disclosure, so that the vehicle battery can be cooled down in time on the condition that the temperature of the battery exceeds a certain temperature, thus ensuring temperature requirements for the battery. The battery in the disclosed embodiments can also be called a battery pack. The battery pack can be adopted with ternary battery cells, which is composed of modules connected in series. The battery pack are internally provided with a battery management system and a battery thermal management system, which may effectively protect safety of the battery pack.

Considering that there are users in the passenger compartment for a long time in the operation phase, an execution strategy in which the passenger compartment is prioritized is set to meet cooling property of the passenger compartment and to ensure thermal comfort of the users in driving.

Therefore, cooling strategies of the embodiment of the present disclosure at least includes a cooling strategy corresponding to the start-up phase and a cooling strategy corresponding to the operation phase. It should be noted that, in a cooling strategy for a respective phase, not only cooling of the battery or the passenger compartment is satisfied, but also a current state of the other party needs to be considered, that is, each of the cooling strategies includes cooling the passenger compartment and cooling the battery. For example, in a cooling strategy for the operation phase, not only cooling of the passenger compartment is considered but also a current state of the battery is considered so as to cool the battery.

The corresponding relationship between the driving phase and the cooling strategy can be stored in a system as an executive program. After the current driving phase of the vehicle is determined by the system, a stored target cooling strategy corresponding to the current driving phase can be queried, and then at least one of the passenger compartment and the battery can be cooled timely according to the target cooling strategy.

In step S103, cooling the passenger compartment and/or the battery according to the target cooling strategy.

Specifically, on the condition that a current driving phase of the vehicle is the start-up phase, an execution process of step S103 can be as follows.

It is prioritized to only cool the battery according to the target cooling strategy corresponding to the start-up phase until a current temperature of the battery is lower than a preset first temperature threshold of the battery and a current temperature of the passenger compartment exceeds a first preset temperature threshold of the passenger compartment, and then it is switched to only cool the passenger compartment.

In the embodiment of the present disclosure, the first temperature threshold of the battery is set in the start-up phase, and on the condition that the temperature of the battery exceeds this temperature threshold, the battery needs to be cooled down urgently to ensure performance of the battery and maintain its service life. Different batteries have different performance, and a corresponding elevation temperature is different. Therefore, the set first temperature threshold of the battery may be different. That is, the first temperature threshold of the battery can be set with reference to the battery actually used in the automobile, which is not limited in this disclosure.

In the start-up phase, in order to embody principle of prioritized cooling of the battery, on the one hand, following steps are provided in an embodiment of the present disclosure.

After the vehicle is powered on and started up, the temperature of the battery is prioritized to be detected by the system so as to determine the current temperature of the battery, and to determine whether the current temperature of the battery exceeds the first temperature threshold of the battery. On the condition that the current temperature of the battery exceeds the first temperature threshold of the battery, an instruction is sent by the system to the air conditioning system, instructing the air conditioning system to only cool the battery, so as to prioritize and meet cooling demand of the battery in the start-up phase.

After the vehicle is powered on and started up, if it is detected by the system that the current temperature of the battery does not exceed (less than or equal to) the first temperature threshold of the battery or has been reduced to be less than the first temperature threshold of the battery by the air conditioning system, which indicates that the current cooling demand of the battery is not the most urgent, and at this time, cooling demand of the passenger compartment is involved by the system. The temperature of the passenger compartment is detected by the system to determine whether the current temperature of the passenger compartment exceeds the preset first temperature threshold of the passenger compartment which is an elevation temperature of the passenger compartment in the start-up phase. On the condition that the current temperature of the battery is lower than the first temperature threshold of the battery and the current temperature of the passenger compartment exceeds the first temperature threshold of the passenger compartment, an instruction is sent by the system to the air conditioning system to instruct the air conditioning system to only cool the passenger compartment. However, considering that the temperature of the battery may rise above the elevation temperature of the battery due to continuous discharge while only cooling the passenger compartment in the start-up phase. Therefore, in order to embody principle of prioritized cooling of the battery, on the other hand, following steps are provided in an embodiment of the present disclosure.

In a process of only cooling the passenger compartment, it is determined whether the current temperature of the battery exceeds a preset second temperature threshold of the battery, and it is switched to only cool the battery on the condition that the current temperature of the battery exceeds the second temperature threshold of the battery. The second temperature threshold of the battery is greater than the first temperature threshold of the battery.

In other words, in the process of cooling only the passenger compartment, the current temperature of the battery is monitored at every time in the embodiment of the present disclosure, so as to switch to cool only the battery in time on the condition that the temperature of the battery is too high. Considering that the temperature may rise due to battery discharge or external environment on the condition that the passenger compartment is cooled, frequent system switching may be caused and the performance of the air conditioning system may be affected if only the current temperature of the battery is compared with the first temperature threshold of the battery. Therefore, a second temperature threshold of the battery is further provided in the present disclosure, the second temperature threshold of the battery is greater than the first temperature threshold of the battery. In this phase, the current temperature of the battery is compared with the preset second temperature threshold of the battery by the system, and it is switched to only cool the battery on the condition that the current temperature of the battery exceeds the second temperature threshold of the battery. In this way, the cooling demand of the battery in the start-up phase can be met first, and a problem of too frequent switching in cooling of the battery and the passenger compartment can be avoided.

Considering all of the factors, it is found that difference between the second temperature threshold of the battery and the first temperature threshold of the battery can preferably be set to be 2° C. For example, if the first temperature threshold of the battery is 43° C., the second temperature threshold of the battery is 45° C.

As this disclosure is proposed for a refrigeration double duty condition of the air conditioning system, which is suitable for current development of new energy vehicles, the battery can be cooled by using water cooling in this disclosure in view of cooling implementation. A water cooling system mainly includes a water pump, a heat exchanger, a cooling fin, an expansion water tank, etc. Water cooling technology is a cooling technology based on liquid heat exchange. Compared with air cooling technology, the water cooling technology is more efficient, provides more uniform internal temperature of a battery pack of an electric vehicle, can be integrated with a cooling system of the vehicle, and exhibits high heat exchange coefficient with a battery wall, with high cooling and heating speeds. A specific structure of cooling the battery and cooling the passenger compartment disclosed in this disclosure is not a focus of this disclosure, and is not limited in this disclosure.

Based on a water cooling mode, the system sends a cooling request to the air conditioning system on the condition that it is determined that only the battery is cooled, and the cooling request includes a requested temperature. Because elevation temperatures of different batteries are different, with referring to the first temperature threshold of the battery, an optimum temperature in the cooling request corresponding to the first temperature threshold of the battery can be preset by the system. For example, on the condition that the temperature of the battery exceeds 43° C. (the first temperature threshold of the battery), an inlet water temperature of 15° C. is requested by the system from the air conditioning system.

Figure 2:
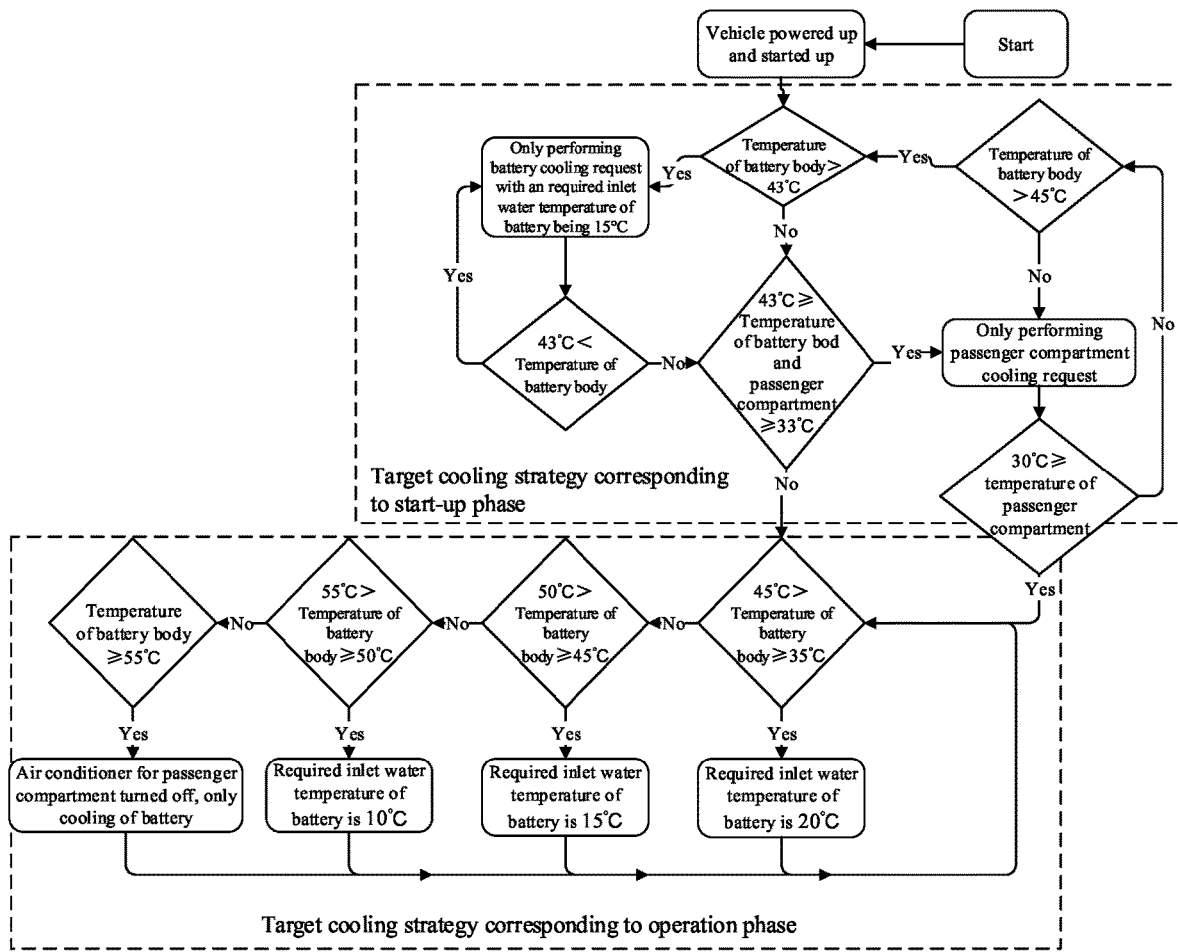
FIG. 2 is a flow chart of an example cooling strategy according to an embodiment of the present disclosure.

For the target cooling strategy corresponding to the start-up phase, reference is made to FIG. 2.

For example, after the vehicle is powered on, it is determined whether the current temperature of the battery is greater than 43° C.

If the current temperature of the battery is greater than 43° C., only the battery is cooled, a required inlet water temperature of the battery of 15° C. is requested by the system from the air conditioning system.

If the current temperature of the battery is less than or equal to 43° C., it is determined by the system whether the current temperature of the passenger compartment is greater than or equal to 33° C.

If the current temperature of the passenger compartment is greater than or equal to 33° C., the system only cools the passenger compartment and turns on the air conditioner. At the same time, it is determined by the system whether the current temperature of the battery is greater than 45° C., and only the battery is cooled on the condition that the current temperature of the battery is greater than 45° C. and an required inlet water temperature of the battery of 15° C. is requested by the system from the air conditioning system.

An implementation mode of the target cooling strategy corresponding to the start-up phase is introduced in detail in the above. In the following, an implementation mode of a target cooling strategy corresponding to the operation phase will be explained in this disclosure.

In an embodiment of the present disclosure, two situations are provided in which the vehicle executes the target cooling strategy corresponding to the operation phase.

Situation 1: the passenger compartment and/or the battery are cooled according to the target cooling strategy corresponding to the operation phase on the condition that the current temperature of the battery does not exceed the first temperature threshold of the battery and the current temperature of the passenger compartment does not exceed the first temperature threshold of the passenger compartment.

There are two possibilities for this to happen. The first one is that after the vehicle is powered on and started up, it is detected by the system that the current temperature of the battery does not exceed the first temperature threshold of the battery and the current temperature of the passenger compartment does not exceed the first temperature threshold of the passenger compartment, which indicates no cooling is performed on either the battery or the passenger compartment during the start-up phase, and the system directly enters the operation phase. The second one is that after the vehicle is powered on and started up, the battery is cooled by the system so that the current temperature of the battery does not exceed the first temperature threshold of the battery. At this time, it is detected that temperature of the passenger compartment does not exceed the elevation temperature of the passenger compartment (the first temperature threshold of the passenger compartment), which meets a condition for entering the operation phase, the system starts to implement the target cooling strategy corresponding to the operation phase.

Referring to FIG. 2, for example, the first temperature threshold of the battery is 43° C. and the first temperature threshold of the passenger compartment is 33° C. On the condition that the temperature of the battery is less than or equal to 43° C. and the passenger compartment temperature is less than or equal to 33° C., the target cooling strategy corresponding to the operation phase is executed by the system so as to cool the passenger compartment and/or the battery.

Situation 2: in a process of cooling only the passenger compartment, the passenger compartment and/or the battery are cooled according to the target cooling strategy corresponding to the operation phase on the condition that the current temperature of the battery does not exceed the second temperature threshold of the battery and the current temperature of the passenger compartment is reduced to be less than or equal to the preset second temperature threshold of the passenger compartment.

The second temperature threshold of the passenger compartment is less than the first temperature threshold of the passenger compartment.

There are two possibilities for this to happen. The first one is that after the vehicle is powered on and started up, it is detected by the system that the current temperature of the battery does not exceed the first temperature threshold of the battery, but the current temperature of the passenger compartment exceeds the first temperature threshold of the passenger compartment, and the passenger compartment is cooled so that the temperature of the passenger compartment is reduced to be less than or equal to the preset second temperature threshold of the passenger compartment. The second one is that the battery and the passenger compartment may be cooled in turn by the system at the start-up phase, and finally the temperature of the passenger compartment is reduced to be less than or equal to the preset second temperature threshold of the passenger compartment in a case where the current temperature of the battery does not exceed the second temperature threshold of the battery. At this time, the system enters the operation phase, and the passenger compartment and/or the battery are cooled according to the target cooling strategy corresponding to the operation phase.

It should be noted that, in the situation 2, the temperature of the passenger compartment is compared with the second temperature threshold of the passenger compartment, but not with the first temperature threshold of the passenger compartment in this disclosure, so that firstly a problem of frequent system switching can be avoided; secondly it has sufficient time for the system to determine whether the battery has a temperature exceeding the preset second temperature threshold of the battery, embodying a strategy of prioritizing to only cool the battery in the start-up phase so as to meet cooling demand of the battery; and thirdly, there's a boundary between the operation phase and the start-up phase, so as to avoid a problem of confused strategy execution of the system.

Referring to FIG. 2, for example, the second temperature threshold of the passenger compartment is 30° C. On the condition that the current temperature of the battery is less than or equal to 45° C. and the temperature of the passenger compartment is less than or equal to 30° C., the target cooling strategy corresponding to the operation phase is executed by the system so as to cool the passenger compartment and/or the battery.

On the condition that a current driving phase of the vehicle is the operation phase, an execution process of step S103 can be as follows.

It is prioritized to cool the passenger compartment according to the target cooling strategy corresponding to the operation phase until the current temperature of the battery exceeds a preset third temperature threshold of the battery, and then it is switched to only cool the battery.

After the system enters the operation phase, a principle of prioritized cooling of passenger compartment is implemented to ensure comfort in the passenger compartment firstly. However, in this process, for the electric vehicles, the battery keeps discharging to provide power and the temperature of the battery may rise. Therefore, the current temperature of the battery is further monitored by the system in real time, and the battery is cooled according to the temperature of the battery while cooling of the passenger compartment is maintained. Unless the current temperature of the battery exceeds the preset third temperature threshold of the battery, it may be switched to only cool the battery. In this way, in a case where the prioritized cooling of the passenger compartment is satisfied, there's a bottom line for controlling the temperature of the battery, so as to avoid a problem that the performance of the battery is affected or the battery is even exploded on the condition that the temperature of the battery rises to a certain degree.

In an embodiment of the present disclosure, following steps are performed by the system in a process of cooling the passenger compartment:

determining whether the current temperature of the battery exceeds the third temperature threshold of the battery; and on the condition that the current temperature of the battery does not exceed the third temperature threshold of the battery, querying a target required inlet water temperature of the battery corresponding to the current temperature of the battery according to a corresponding relationship between a temperature of the battery and a required inlet water temperature of the battery, and cooling the battery according to the target required inlet water temperature of the battery and remaining the current temperature of the passenger compartment not exceeding a preset third temperature threshold of the passenger compartment at the same time. Wherein different temperature intervals of the battery correspond to different required inlet water temperatures of the battery.

In the operation phase, the battery is cooled according to the temperature of the battery while cooling of the passenger compartment is maintained. It is found in the present disclosure that a step-by-step cooling strategy for the battery is provided, and the corresponding relationship between the temperature of the battery and the required inlet water temperature of the battery is preset. Different temperature intervals of the battery correspond to the different required inlet water temperatures of the battery, which not only realizes controlling of the temperature of the battery, but also realizes efficient operation of the air conditioning system under the refrigeration double duty condition, which facilitates maintaining of the air conditioning system and avoiding its long-term high load state. Decreasing the required inlet water temperature of the battery step by step until stopping of the cooling of the passenger compartment reflects a transition process from the prioritized cooling of the passenger compartment to the prioritized cooling of the battery in the operation phase of the vehicle.

Of course, based on the strategy of prioritized cooling of the passenger compartment in the operation phase, a lower temperature limit in gradually cooling the battery is further provided in this disclosure, that is, the battery is cooled while ensuring that the current temperature of the passenger compartment does not exceed the preset third temperature threshold of the passenger compartment. In other words, on the condition that the temperature of the battery does not exceed the third temperature threshold of the battery and the current temperature of the passenger compartment exceeds the third temperature threshold of the passenger compartment, only the passenger compartment can be cooled.

In the above, the second temperature threshold of the battery, the third temperature threshold of the battery, the first temperature threshold of the passenger compartment, the second temperature threshold of the passenger compartment and the third temperature threshold of the passenger compartment are not limited in the embodiments of the present disclosure, as long as rationality of implementation of the cooling strategy is ensured.

In an embodiment of the present disclosure, the corresponding relationship between the temperature of the battery and the required inlet water temperature of the battery includes:

on the condition that a preset fourth temperature threshold of the battery is less than or equal to the temperature of the battery and the temperature of the battery is less than a preset fifth temperature threshold of the battery, the required inlet water temperature of the battery is a first temperature;

on the condition that the fifth temperature threshold of the battery is less than or equal to the temperature of the battery and the temperature of the battery is less than a preset sixth temperature threshold of the battery, the required inlet water temperature of the battery is a second temperature;

on the condition that the sixth temperature threshold of the battery is less than or equal to the temperature of the battery and the temperature of the battery is less than the third temperature threshold of the battery, the required inlet water temperature of the battery is a third temperature;

wherein the third temperature is less than the second temperature and the second temperature is less than the first temperature.

In the above, the fourth temperature threshold of the battery may be set to 35° C. On the condition that the temperature of the battery is lower than the fourth temperature threshold of the battery, the air conditioning system may only cool the passenger compartment in the operation phase, but not to cool the battery. Optionally, the fifth temperature threshold of the battery may be the same as the second temperature threshold of the battery, for example, 45° C., which reflects a timely cooling strategy in the start-up phase and the operation phase. A specific value of the required inlet water temperature of the battery is not limited in embodiments of this disclosure, which can be determined according to properties of the battery and the battery pack.

For the target cooling strategy corresponding to the operation phase, reference is made to FIG. 2.

For example, while cooling of the passenger compartment is maintained, the current temperature of the battery is determined and the battery is cooled according to a step-by-step cooling strategy. In this process, it is ensured that the temperature of the passenger compartment does not exceed 28° C.:

on the condition that the temperature of the battery is greater than or equal to 35° C. and less than 45° C., the required inlet water temperature of the battery is 20° C.;

on the condition that the temperature of the battery is greater than or equal to 45° C. and less than 50° C., the required inlet water temperature of the battery is 15° C.;

on the condition that the temperature of the battery is greater than or equal to 50° C. and less than 55° C., the required inlet water temperature of the battery is 10° C.;

on the condition that the temperature of the battery is greater than or equal to 55° C., the air conditioner for the passenger compartment is turned off, and only the cooling of the battery is kept.

Figure 3:
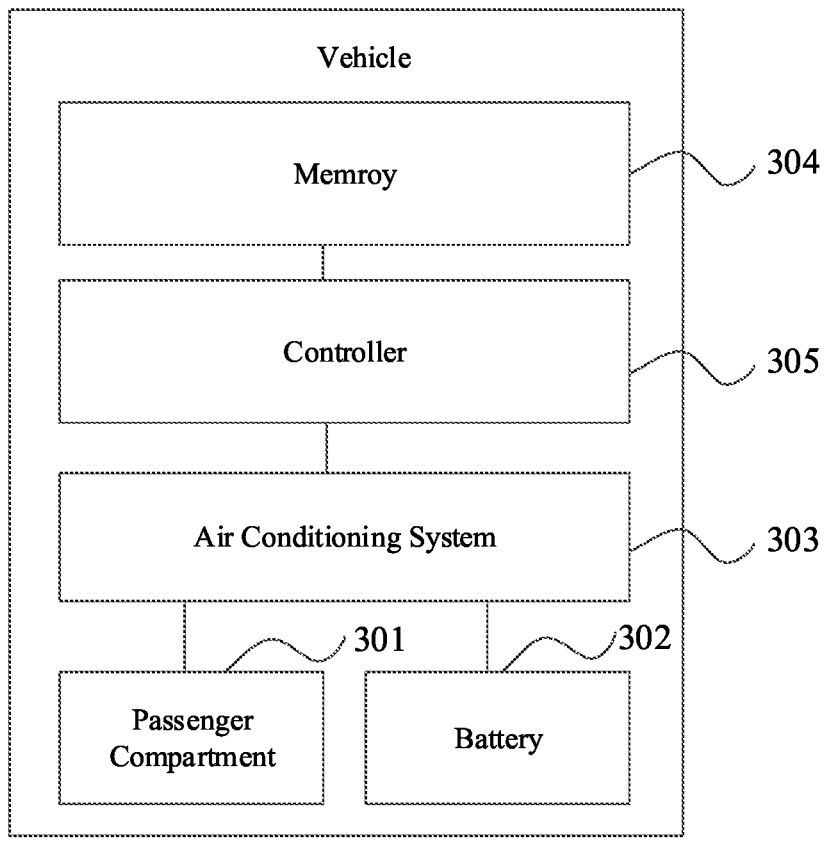
FIG. 3 is a schematic structural diagram of a vehicle according to an embodiment of the present disclosure.

Based on a same inventive concept, referring to FIG. 3, a structural schematic diagram of a vehicle is provided in an embodiment of the present disclosure, which includes a passenger compartment 301, a battery 302, an air conditioning system 303, a memory 305 for storing executable instructions of a controller 304, and the controller 304.

The controller 304 is configured to execute the method for cooling the passenger compartment and the battery according to an embodiment of the present disclosure so as to control the air conditioning system 303 to cool the passenger compartment 301 and/or the battery 302.

For the vehicle according to the disclosed embodiment, a priority strategy for cooling the passenger compartment and the battery may be adaptively changed according to different driving phases and different conditions in the driving phases, embodying a thought and principle of "timely", so as to provide both cooling of the battery without affecting dynamic property of the whole vehicle and battery life and cooling comfort of the passenger compartment with no customer complaint being caused, with limited capacity of an air conditioning system. Meanwhile, energy consumption of the whole vehicle can be reduced to the greatest extent, and more energy of the whole vehicle can be used for vehicle endurance, with high flexibility.

It should be noted that, for sake of simple description, the method embodiments are all expressed as combination of a series of action, but it should be known by those skilled in the art should that the embodiments of the present disclosure are not limited by a sequence of the described actions, because some of the steps can be performed in other sequences or simultaneously according to the embodiments of the present disclosure. Secondly, it also should be known by those skilled in the art that the embodiments described in the specification are all preferred embodiments, and the actions involved are not necessary for the embodiments of the present disclosure.

Figure 4:
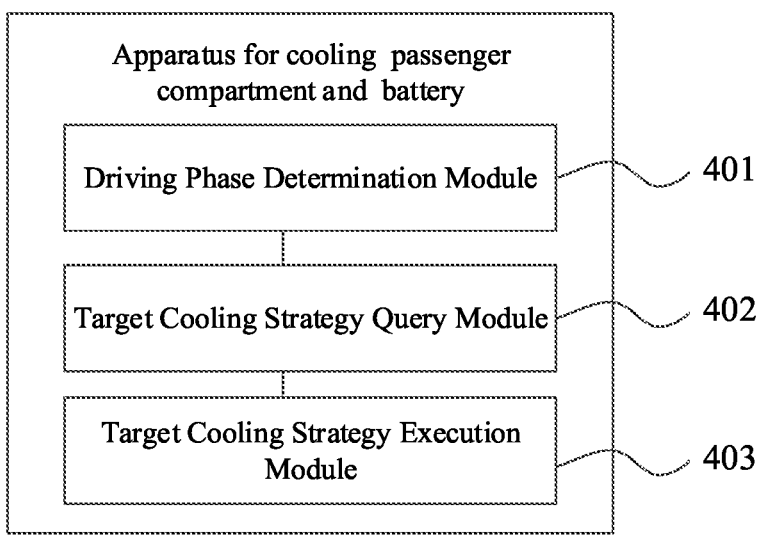
FIG. 4 is a schematic diagram of functional modules of an apparatus for cooling a passenger compartment and a battery according to an embodiment of the present disclosure.

Based on the same inventive concept, referring to FIG. 4, a schematic diagram of functional modules of an apparatus for cooling a passenger compartment and a battery is further provided in the embodiment of the present disclosure, which may include the following modules:

a driving phase determination module 401 configured to determine a current driving phase of the vehicle;

a target cooling strategy query module 402 configured to query a target cooling strategy of the vehicle corresponding to the current driving phase according to a corresponding relationship between a driving phase and a cooling strategy, wherein different driving phases correspond to different cooling strategies, and each of the cooling strategies includes cooling the passenger compartment and cooling the battery;

a target cooling strategy execution module 403 configured to cool the passenger compartment and/or the battery according to the target cooling strategy.

In an embodiment of the present disclosure, the driving phase includes a start-up phase, the driving phase determination module 401 includes:

a start-up phase determination submodule configured to determine the vehicle is currently in the start-up phase, on the condition that a trigger operation of powering up the vehicle is received;

the target cooling strategy execution module 403 may include:

a first start-up phase execution submodule configured for prioritizing to only cool the battery according to the target cooling strategy corresponding to the start-up phase until a current temperature of the battery is less than a preset first temperature threshold of the battery and a current temperature of the passenger compartment exceeds a first preset temperature threshold of the passenger compartment, and then switching to only cool the passenger compartment.

In an embodiment of the present disclosure, the target cooling strategy execution module 403 may include:

a first battery temperature determination submodule configured to determine the current temperature of the battery;

a battery cooling execution submodule configured to only cool the battery on the condition that the current temperature of the battery exceeds the first temperature threshold of the battery;

wherein in a process of only cooling the passenger compartment, the target cooling strategy execution module 403 may further include:

a second start-up phase execution submodule configured for determining whether the current temperature of the battery exceeds a preset second temperature threshold of the battery, and switching to only cool the battery on the condition that the current temperature of the battery exceeds the second temperature threshold of the battery;

wherein the second temperature threshold of the battery is greater than the first temperature threshold of the battery.

In an embodiment of the present disclosure, the driving phase further includes an operation phase, and the target cooling strategy execution module 403 may include:

a first cooling strategy switching submodule configured to cool the passenger compartment and/or the battery according to the target cooling strategy corresponding to the operation phase on the condition that the current temperature of the battery does not exceed the first temperature threshold of the battery and the current temperature of the passenger compartment does not exceed the first temperature threshold of the passenger compartment; or a second cooling strategy switching submodule is configured to, in a process of cooling only the passenger compartment, cool the passenger compartment and/or the battery according to the target cooling strategy corresponding to the operation phase on the condition that the current temperature of the battery does not exceed the second temperature threshold of the battery and the current temperature of the passenger compartment is reduced to be less than or equal to the preset second temperature threshold of the passenger compartment;

wherein the second temperature threshold of the passenger compartment is smaller than the first temperature threshold of the passenger compartment.

In an embodiment of the present disclosure, the driving phase includes an operation phase, the target cooling strategy execution module 403 may include:

a first operation phase execution submodule configured for prioritizing to cool the passenger compartment according to the target cooling strategy corresponding to the operation phase until the current temperature of the battery exceeds a preset third temperature threshold of the battery, and then switching to only cool the battery.

In an embodiment of the present disclosure, in a process of cooling the passenger compartment, the target cooling strategy execution module 403 may further include:

a second battery temperature determination submodule configured to determine whether the current temperature of the battery exceeds the third temperature threshold of the battery; and a second operation phase execution sub-module configured to query a target required inlet water temperature of the battery corresponding to the current temperature of the battery according to a corresponding relationship between a temperature of the battery and a required inlet water temperature of the battery on the condition that the current temperature of the battery does not exceed the third temperature threshold of the battery, and cool the battery according to the target required inlet water temperature of the battery and remaining the current temperature of the passenger compartment not exceeding the preset third temperature threshold of the passenger compartment at the same time, wherein different temperature intervals of the battery correspond to different required inlet water temperatures of the battery.

In an embodiment of the present disclosure, the corresponding relationship between the temperature of the battery and the required inlet water temperature of the battery includes:

on the condition that a preset fourth temperature threshold of the battery is less than or equal to the temperature of the battery and the temperature of the battery is less than a preset fifth temperature threshold of the battery, the required inlet water temperature of the battery is a first temperature;

on the condition that the fifth temperature threshold of the battery is less than or equal to the temperature of the battery and the temperature of the battery is less than a preset sixth temperature threshold of the battery, the required inlet water temperature of the battery is a second temperature;

on the condition that the sixth temperature threshold of the battery is less than or equal to the temperature of the battery and the temperature of the battery is less than the third temperature threshold of the battery, the required inlet water temperature of the battery is a third temperature;

wherein the third temperature is less than the second temperature and the second temperature is less than the first temperature.

The above-described apparatus embodiments are only schematic, in which units described as separate components may or may not be physically separated, and the components shown as the units may or may not be physical units. That is, they may be located in one place or distributed over multiple network units. Some or all of the modules can be selected according to actual needs to achieve purposes of this embodiment. The embodiments can be understood and implemented by the ordinary skilled in the art without paying creative labor.

Various component embodiments disclosed herein can be implemented in hardware, or in software modules executed on one or more processors, or in a combination thereof. It should be understood by those skilled in the art that some or all of functions of some or all of the components in the computing processing device according to the embodiments of the present disclosure can be realized in practice by using a microprocessor or a digital signal processor (DSP). The present disclosure can also be implemented as device or apparatus programs (e.g., computer programs and computer program products) for performing part or all of the methods described herein. Such programs for realizing the present disclosure may be stored on a computer readable medium, or may be in a form of one or more signals. Such signals can be downloaded from Internet websites, or provided on carrier signals, or provided in any other form.

Figure 5:
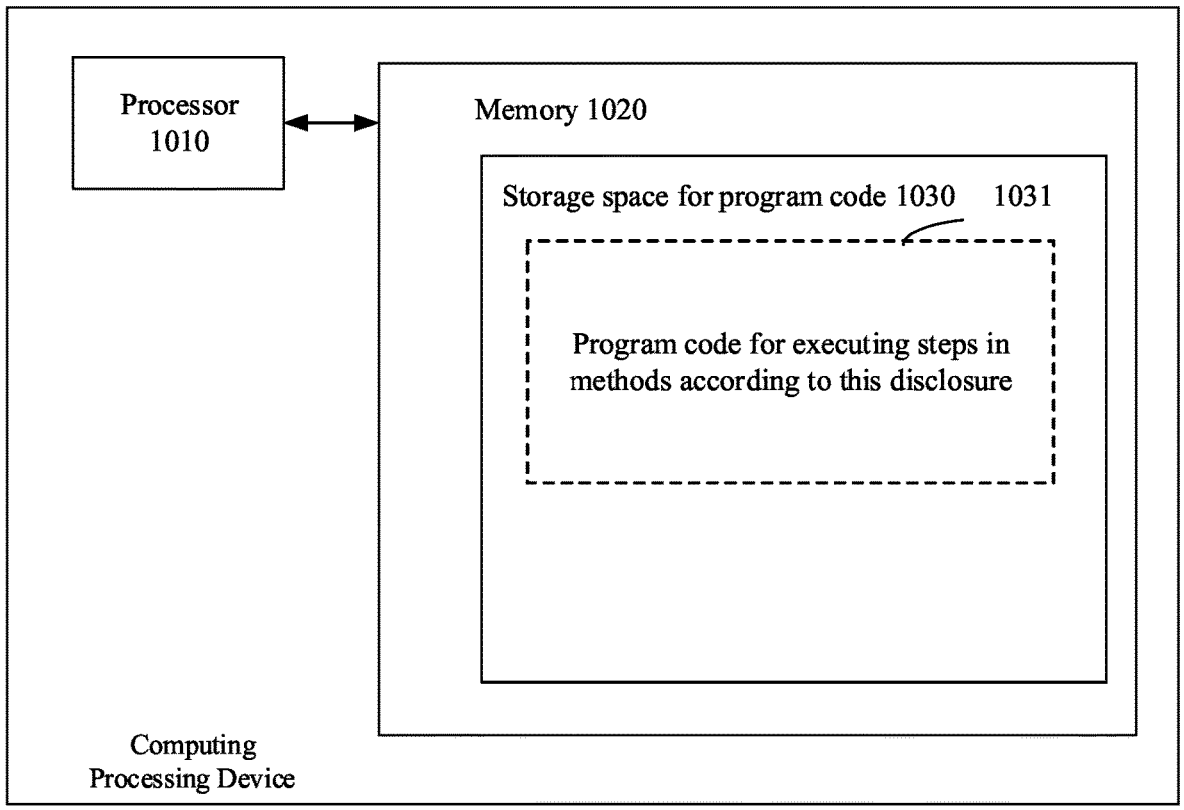
FIG. 5 schematically shows a block diagram of a computing and processing device for executing the method according to the present disclosure.
Figure 6:
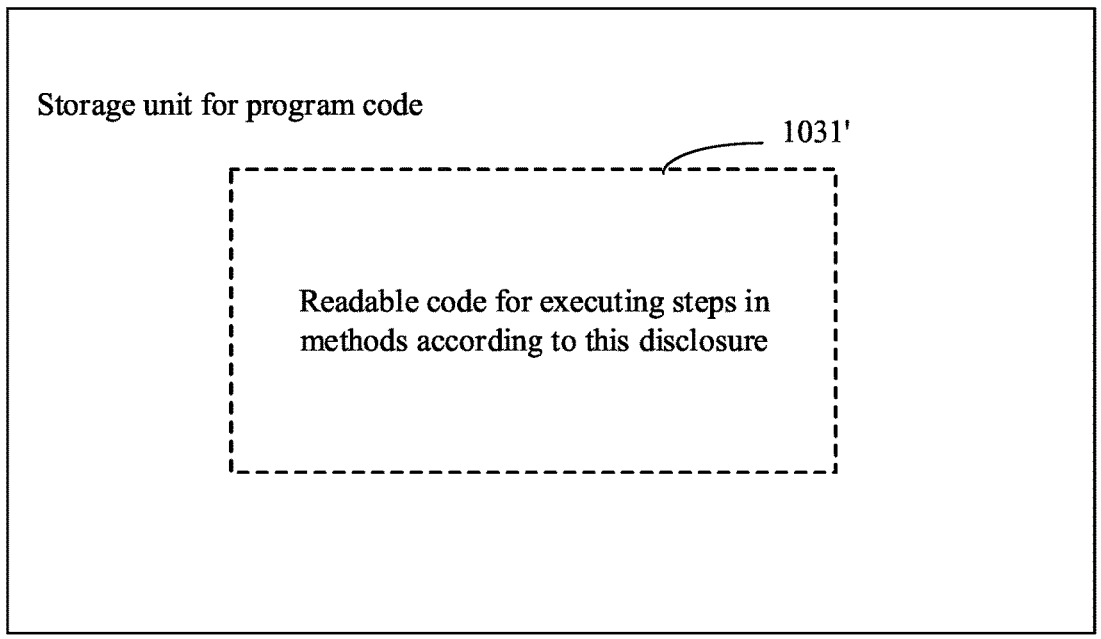
FIG. 6 schematically shows a storage unit for holding or carrying program codes for implementing the method according to the present disclosure.

For example, FIG. 5 shows a computing processing device that can implement the methods according to the present disclosure. The computing processing device conventionally includes a processor 1010 and a computer program product or a computer readable medium in a form of a memory 1020. The memory 1020 may be an electronic memory such as a flash memory, an EEPROM (electrically erasable programmable read only memory), an EPROM, a hard disk or a ROM. The memory 1020 has a storage space 1030 for program codes 1031 for executing any of steps in the above methods. For example, the storage space 1030 for program codes may include various program codes 1031 for implementing various steps in the above method, respectively. These program codes can be read from or written into one or more computer program products. These computer program products include program code carriers such as hard disks, compact disks (CD), memory cards or floppy disks. Such computer program products are usually portable or fixed storage units as described with reference to FIG. 6. The memory unit may have memory segments, memory spaces, and the like arranged similarly to the memory 1020 in the computing processing device of FIG. 5. The program can be compressed in an appropriate form, for example. Generally, the storage unit includes computer readable codes 1031', i.e., codes that can be read by, for example, a processor such as 1010, which, on the condition that executed by a computing processing device, causes the computing processing device to perform various steps in the methods described above.

It should be noted that various embodiments in this specification are described in a progressive way, and each of the embodiments has a different focus from other embodiments. The same and similar parts among the embodiments can be referred to each other.

It should be understood that the terms "center", "upper", "lower", "left", "right", "vertical", "horizontal", "inner" and "outer" which indicate an orientation or positional relationship are based on the orientation or positional relationship shown in the drawings, and are merely for convenience of describing the present disclosure and simplifying the description, rather than indicate or imply that the device or element referred to must have a specific orientation, be configured and operated in a specific orientation, and thus cannot be understood as a limitation on the present disclosure. In addition, relational terms such as "first" and "second" are only used to distinguish one entity or operation from another entity or operation, and do not necessarily require or imply any such actual relationship or sequence among these entities or operations, nor can they be understood as indicating or implying relative importance. Moreover, terms "comprising", "including" or any other variation thereof are intended to encompass a non-exclusive inclusion, so that a process, method, article or terminal device including a series of elements includes not only those elements, but also other elements not explicitly listed, or elements inherent to such a process, method, article or terminal device. Without further restrictions, an element defined by the statement "includes a . . . " does not exclude presence of other identical elements in the process, method, article or terminal device including the element.

The technical solutions provided by the above disclosure are introduced in detail. In this paper, specific examples are used to explain the principle and implementations of the disclosure. Explanations of the above embodiments are only used to help understand the disclosure, and content of this specification should not be construed as limitations on the disclosure. Meanwhile, for those skilled in the art, according to this disclosure, there will be different forms of changes in specific embodiments and its application scope, and it is not necessary and impossible to exhaust all of the embodiments herein. Obvious changes or variations derived therefrom are still within the protection scope of this disclosure.

The invention claimed is:

1. A method for cooling a passenger compartment and a battery, comprising:
determining a current driving phase of a vehicle;
querying a target cooling strategy corresponding to the current driving phase of the vehicle according to a corresponding relationship between a driving phase and a cooling strategy, wherein different driving phases correspond to different cooling strategies, and each of the cooling strategies comprises cooling the passenger compartment and cooling the battery; and
cooling the passenger compartment and/or the battery according to the target cooling strategy;
wherein the driving phase comprises an operation phase, and cooling the passenger compartment and/or the battery according to the target cooling strategy comprises:
prioritizing to cool the passenger compartment according to the target cooling strategy corresponding to the operation phase until the current temperature of the battery exceeds a preset third temperature threshold of the battery, and then switching to only cool the battery;
wherein in a process of cooling the passenger compartment, the method further comprises:
determining whether the current temperature of the battery exceeds the third temperature threshold of the battery;
on the condition that the current temperature of the battery does not exceed the third temperature threshold of the battery, querying a target required inlet water temperature of the battery corresponding to the current temperature of the battery according to a corresponding relationship between a temperature of the battery and a required inlet water temperature of the battery, and cooling the battery according to the target required inlet water temperature of the battery and remaining the current temperature of the passenger compartment not exceeding a preset third temperature threshold of the passenger compartment at the same time, wherein different temperature intervals of the battery corresponding to different required inlet water temperatures of the battery.

2. The method according to claim 1, wherein the driving phase comprises a start-up phase, and determining the current driving phase of the vehicle comprises:
determining that the vehicle is currently in the start-up phase, on the condition that a trigger operation of powering up the vehicle is received.

3. The method according to claim 1, wherein the driving phase comprises a start-up phase, and cooling the passenger compartment and/or the battery according to the target cooling strategy comprises:
prioritizing to only cool the battery according to the target cooling strategy corresponding to the start-up phase until a current temperature of the battery is lower than a preset first temperature threshold of the battery and a current temperature of the passenger compartment exceeds a first preset temperature threshold of the passenger compartment, and then switching to only cool the passenger compartment.

4. The method according to claim 3, wherein prioritizing to only cool the battery according to the target cooling strategy corresponding to the start-up phase comprises:
determining the current temperature of the battery; and
cooling only the battery on the condition that the current temperature of the battery exceeds the first temperature threshold of the battery.

5. The method according to claim 3, wherein in a process of only cooling the passenger compartment, the method further comprises:
determining whether the current temperature of the battery exceeds a preset second temperature threshold of the battery, and switching to only cool the battery on the condition that the current temperature of the battery exceeds the second temperature threshold of the battery;
wherein the second temperature threshold of the battery is greater than the first temperature threshold of the battery.

6. The method according to claim 5, wherein the driving phase further comprises an operation phase, and cooling the passenger compartment and/or the battery according to the target cooling strategy comprises:
cooling the passenger compartment and/or the battery according to the target cooling strategy corresponding to the operation phase on the condition that the current temperature of the battery does not exceed the first temperature threshold of the battery and the current temperature of the passenger compartment does not exceed the first temperature threshold of the passenger compartment; or
cooling the passenger compartment and/or the battery according to the target cooling strategy corresponding to the operation phase on the condition that the current temperature of the battery does not exceed the second temperature threshold of the battery and the current temperature of the passenger compartment is reduced to be less than or equal to a preset second temperature threshold of the passenger compartment, in a process of cooling only the passenger compartment;
wherein the second temperature threshold of the passenger compartment is less than the first temperature threshold of the passenger compartment.

7. The method according to claim 1, wherein the corresponding relationship between the temperature of the battery and the required inlet water temperature of the battery comprises:
on the condition that a preset fourth temperature threshold of the battery is less than or equal to the temperature of the battery and the temperature of the battery is less than a preset fifth temperature threshold of the battery, the required inlet water temperature of the battery is a first temperature;
on the condition that the fifth temperature threshold of the battery is less than or equal to the temperature of the battery and the temperature of the battery is less than a preset sixth temperature threshold of the battery, the required inlet water temperature of the battery is a second temperature;
on the condition that the sixth temperature threshold of the battery is less than or equal to the temperature of the battery and the temperature of the battery is less than the third temperature threshold of the battery, the required inlet water temperature of the battery is a third temperature;
wherein the third temperature is less than the second temperature and the second temperature is less than the first temperature.

8. A vehicle, comprising a passenger compartment, a battery, an air conditioning system, a memory for storing executable instructions of a controller and the controller, wherein the air conditioning system is an air conditioner; wherein the controller is configured to execute the following operations so as to control the air conditioning system to cool the passenger compartment and/or the battery:

determining a current driving phase of a vehicle;

querying a target cooling strategy corresponding to the current driving phase of the vehicle according to a corresponding relationship between a driving phase and a cooling strategy, wherein different driving phases correspond to different cooling strategies, and each of the cooling strategies comprises cooling the passenger compartment and cooling the battery; and cooling the passenger compartment and/or the battery according to the target cooling strategy;

wherein the driving phase comprises an operation phase, and the operation of cooling the passenger compartment and/or the battery according to the target cooling strategy comprises:

prioritizing to cool the passenger compartment according to the target cooling strategy corresponding to the operation phase until the current temperature of the battery exceeds a preset third temperature threshold of the battery, and then switching to only cool the battery;

wherein in a process of cooling the passenger compartment, the operations further comprise:

determining whether the current temperature of the battery exceeds the third temperature threshold of the battery;

on the condition that the current temperature of the battery does not exceed the third temperature threshold of the battery, querying a target required inlet water temperature of the battery corresponding to the current temperature of the battery according to a corresponding relationship between a temperature of the battery and a required inlet water temperature of the battery, and cooling the battery according to the target required inlet water temperature of the battery and remaining the current temperature of the passenger compartment not exceeding a preset third temperature threshold of the passenger compartment at the same time, wherein different temperature intervals of the battery corresponding to different required inlet water temperatures of the battery.

9. A non-transitory computer readable medium, wherein the non-transitory computer-readable medium stores a computer-readable code, and when the computer-readable code is executed, the method for cooling a passenger compartment and a battery according to claim 1 is performed.

10. The vehicle according to claim 8, wherein the driving phase comprises a start-up phase, and the operation of determining the current driving phase of the vehicle comprises:

determining that the vehicle is currently in the start-up phase, on the condition that a trigger operation of powering up the vehicle is received.

11. The vehicle according to claim 8, wherein the driving phase comprises a start-up phase, and the operation of cooling the passenger compartment and/or the battery according to the target cooling strategy comprises:

prioritizing to only cool the battery according to the target cooling strategy corresponding to the start-up phase until a current temperature of the battery is lower than a preset first temperature threshold of the battery and a current temperature of the passenger compartment exceeds a first preset temperature threshold of the passenger compartment, and then switching to only cool the passenger compartment.

12. The vehicle according to claim 11, wherein the operation of prioritizing to only cool the battery according to the target cooling strategy corresponding to the start-up phase comprises:

determining the current temperature of the battery; and cooling only the battery on the condition that the current temperature of the battery exceeds the first temperature threshold of the battery.

13. The vehicle according to claim 11, wherein in a process of only cooling the passenger compartment, the operations further comprise:

determining whether the current temperature of the battery exceeds a preset second temperature threshold of the battery, and switching to only cool the battery on the condition that the current temperature of the battery exceeds the second temperature threshold of the battery;

wherein the second temperature threshold of the battery is greater than the first temperature threshold of the battery.

14. The vehicle according to claim 13, wherein the driving phase further comprises an operation phase, and the operation of cooling the passenger compartment and/or the battery according to the target cooling strategy comprises:

cooling the passenger compartment and/or the battery according to the target cooling strategy corresponding to the operation phase on the condition that the current temperature of the battery does not exceed the first temperature threshold of the battery and the current temperature of the passenger compartment does not exceed the first temperature threshold of the passenger compartment; or cooling the passenger compartment and/or the battery according to the target cooling strategy corresponding to the operation phase on the condition that the current temperature of the battery does not exceed the second temperature threshold of the battery and the current temperature of the passenger compartment is reduced to be less than or equal to a preset second temperature threshold of the passenger compartment, in a process of cooling only the passenger compartment;

wherein the second temperature threshold of the passenger compartment is less than the first temperature threshold of the passenger compartment.

* * * * *